United States Patent Office 3,118,872
Patented Jan. 21, 1964

3,118,872
N-ALKYLIDENE-p-PHENYLAZOANILINES
Robert W. Layer, Cuyahoga Falls, Ohio, assignor to The B. F. Goodrich Company, New York, N.Y., a corporation of New York
No Drawing. Filed Dec. 16, 1960, Ser. No. 76,136
7 Claims. (Cl. 260—205)

This invention deals with the preparation of N-alkylidene-p-phenylazoanilines by the reaction of aliphatic ketones and cycloaliphatic ketones with p-phenylazoaniline. It has been known that both aliphatic aldehydes and aromatic aldehydes react with p-phenylazoaniline to give anils, but aliphatic ketones and aromatic ketones have not reacted with p-phenylazoaniline under similar conditions.

N-alkylidene-p-phenylazoanilines are desirable materials for, in addition to serving as dyeing and coloring agents for textile materials and the like, they will undergo reduction to form N-alkyl-p-phenylene-diamines, a class of materials which is of interest in the compounding of rubber and other elastomeric materials.

In the case of water-soluble ketones which cannot give an irreversible condensation product by the elimination of water, it has been found helpful to reflux the reaction media with a water azeotroping agent such as benzene. Cyclohexanone and 2-butanone are examples of this type of material.

The reaction is accomplished by placing p-phenylazoaniline, the desired ketone and benzene in a reaction flask fitted with a condensing trap. The mixture is refluxed until a predetermined amount of water of reaction is collected. The theoretical amount of water is collected, depending on the amounts of reactants employed. The benzene and excess carbonyl compound are removed by distillation under slight vacuum leaving a crude product mass. The product is refined by vacuum distillation at about 0.5 mm. of vacuum.

Any aliphatic ketone, including cycloaliphatic ketones, may be used in the practice of this invention. These compounds have the generic formula

where R and R' may be the same or different and selected from the radicals consisting of alkyl radicals containing 1 to 15 carbon atoms, or R and R' may be connected to form a 3, 4, 5 or 6 member ring of —CH$_2$— groups attached to the carbonyl carbon atom. Specific examples of the ketones that are found useful in the practice of this invention include acetone, methylethylketone, methylpropylketone, ethylpropylketone, 2-octanone, decyldodecylketone, cyclohexanone, cyclopropanone, cyclobutanone and cyclopentanone.

The N-alkylidene-p-phenylazoanilines are useful as dyestuffs in azo dyeing of textiles. They also serve as useful chemical intermediates for they will undergo reduction to N-alkyl-p-phenylazoanilines and then to N-alkyl-p-phenylenediamines. The N-alkyl substituted p-phenylene-diamines are well-known age resistor chemicals used in the rubber compounding art.

The practice of my invention is illustrated by the following examples.

*Example I*

A mixture of 30 g. (0.15 mole) of p-phenylazoaniline, 100 ml. of 2-octanone and 100 ml. of benzene was placed in a 500 ml. flask fitted with a condensing trap. The mixture was refluxed until the theoretical volume of water (2.4 ml.) was collected. Benzene and excess ketone were removed by distillation under vacuum maintained by a water aspirator. The crude product was further vacuum distilled at 0.5 mm. maintained by a vacuum pump.

The reaction product of 2-octanone and p-phenylazoaniline is N-1-methylheptylidene-p-phenylazoaniline. That this was the product formed was proved by taking an infrared spectrum which showed the formation of a strong band at 6.0μ which is characteristic of substituted imines. An elemental analysis calculated on the basis of the product N-1-methyl-heptylidene-p-phenylazoaniline, $C_{20}H_{25}N_3$, showed:

|   | Calc. | Found |
|---|---|---|
| C | 78.1 | 77.8 |
| H | 8.20 | 7.98 |
| N | 13.7 | 13.6 |

The N-1-methylheptylidene-p-phenylazoaniline, was refined by distilling off excess 2-octanone and then dissolved in methanol at 45° C. Sodium borohydride (3.7 g.) was added slowly so that the temperature was maintained below 50° C. The mixture was refluxed 10 minutes, cooled and diluted with 200 ml. water. Methanol was removed by distillation and the product was extracted with ether. Drying and distillation of the ether gave 44 g. of crude product. Vacuum distillation at 0.3 mm. gave 21 g. of N-1-methylheptyl-p-phenylazoaniline which boiled at 208°–210° C. Compared to the infrared spectrum of the initial product, a spectrum of this material showed no strong band at 6μ (characteristic of substituted imino groups), but did have a band at 3.0 to 3.25μ (characteristic of N—H bonds). Heated with dilute hydrochloric acid, the material gave no odor of 2-octanone. An elemental analysis was run and calculated for $C_{20}H_{27}N_3$, N-1-methylheptyl-p-phenylazoaniline:

|   | Calc. | Found |
|---|---|---|
| C | 77.6 | 77.3 |
| H | 8.80 | 8.70 |
| N | 13.6 | 13.6 |

N-1-methylheptyle-p-phenylazoaniline was further reduced by adding 210 g. to a solution of 300 ml. ethanol, 300 ml. water and 45.0 g. potassium hydroxide. The solution was warmed to 70° C. and 50.0 g. of sodium dithionate were slowly added and the mass was refluxed for one hour. Ethanol was distilled off and an ether extract made. The ether extract dried and distilled to give 14 g. of product. The product boiled at 80°–82° C. at 20 mm. and on analysis proved to be N-1-methylheptyl-p-phenylenediamine, $C_{14}H_{24}N_3$,

|   | Calc. | Found |
|---|---|---|
| C | 76.3 | 75.9. |
| H | 11.0 | 10.9. |
| N | 12.7 | 13.2 (by difference). |

An azoic dyebath containing 0.5 g. of N-methylheptylidene-p-phenylazoaniline dissolved in 50 ml. of ethanol and 5.0 g. of bleached, white cotton cloth was prepared. The dyebath was maintained at the boil for 1 hour and the textile developed a deep yellow color.

*Example II*

Following the procedure of Example I, cyclohexanone and p-phenylazoaniline were reacted to form N-cyclohexylidene-p-phenylazoaniline, $C_{18}H_{19}N_3$,

|   | Calc. | Found |
|---|---|---|
| C | 77.9 | 77.1 |
| H | 6.90 | 6.95 |
| N | 15.2 | 15.5 |

The infrared spectrum showed a strong band at $6.0\mu$.

After excess cyclohexanone was distilled off, the crude product was dissolved in methanol at 40° C. Sodium borohydride (3.7 g.) was slowly added and the temperature was maintained at 40°–60° C. The mixture was refluxed for 1 hour. Two recrystallizations from ethanol-water gave a solid melting at 110°–111° C. Infrared analysis showed no absorption at $6.0\mu$, but did show a band at $3.0\mu$ (indicative of the N—H bond). Analysis and calculation for $C_{18}H_{21}N_3$, N-cyclohexyl-p-phenylazoaniline, showed:

|   | Calc. | Found |
|---|---|---|
| C | 77.4 | 77.1 |
| H | 7.58 | 7.30 |
| N | 15.0 | 15.2 |

I claim:
1. N-saturated-alkylidene-p-phenylazoanilines of the formula

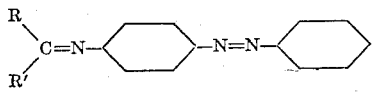

wherein R and R' are selected from the group consisting of alkyl radicals containing from 1 to 15 carbon atoms and cyclic radicals wherein R and R' are connected to form 3, 4, 5, and 6 membered alicyclic rings of —CH₂— groups, said R and R' groups consisting solely of radicals of carbon and hydrogen.

2. N-1-alkyl-alkylidene-p-phenylazoanilines of the formula

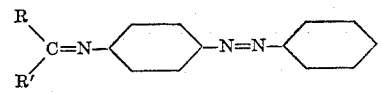

wherein R and R' are selected from the group consisting of alkyl radicals containing from 1 to 15 carbon atoms said R and R' groups consisting solely of radicals of carbon and hydrogen.

3. N-1-methylheptylidene-p-phenylazoaniline.
4. N-cyclohexylidene-p-phenylazoaniline.
5. The process of forming N-saturated-alkylidene-p-phenylazoanilines comprising reacting an aliphatic ketone with p-phenylazoaniline at the reflux temperature in the presence of benzene as a water azeotroping agent until the theoretical amount of water of reaction is collected, said aliphatic ketone consisting solely of hydrocarbon groups connected to the carbonyl carbon atom.
6. The process of forming N-saturated-alkylidene-p-phenylazoanilines of the formula

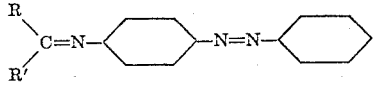

wherein R and R' are selected from the group consisting of alkyl radicals containing from 1 to 15 carbon atoms and cyclic radicals wherein R and R' are connected to form 3, 4, 5, and 6 membered alicyclic rings of —CH₂— groups, said R and R' groups consisting solely of radicals of carbon and hydrogen, by the reaction at the reflux temperature in the presence of benzene as a water azeotroping agent until the theoretical amount of water of reaction is collected, of p-phenylazoaniline with a ketone selected from the class consisting of aliphatic ketones, and alicyclic ketone, said ketone consisting solely of hydrocarbon groups connected to the carbonyl carbon atom.
7. The process of forming N-1-methylheptylidene-p-phenylazoaniline comprising reacting 2-octanone and p-phenylazoaniline at the reflux temperature in the presence of benzene as a water azeotroping agent until the theoretical amount of water of reaction is collected.

References Cited in the file of this patent

UNITED STATES PATENTS

| 2,414,031 | Emerson | Jan. 7, 1947 |
| 2,822,396 | Dent | Feb. 4, 1958 |

FOREIGN PATENTS

| 1,239,702 | France | July 18, 1960 |

OTHER REFERENCES

Degering: "An Outline of Organic Nitrogen Compounds" (1945), pages 203, 214 and 299.